(12) United States Patent
Floquet

(10) Patent No.: US 11,963,012 B2
(45) Date of Patent: Apr. 16, 2024

(54) SYSTEM AND METHOD FOR IDENTIFYING A USER TERMINAL FORMING PART OF AN ENTERTAINMENT SYSTEM FOR A MOBILE PASSENGER TRANSPORT APPARATUS

(71) Applicant: THALES, Courbevoie (FR)

(72) Inventor: Nicolas Floquet, Merignac (FR)

(73) Assignee: THALES, Courbevoie (FR)

( * ) Notice: Subject to any disclaimer, the term of this patent is extended or adjusted under 35 U.S.C. 154(b) by 259 days.

(21) Appl. No.: 17/638,426

(22) PCT Filed: Aug. 26, 2020

(86) PCT No.: PCT/EP2020/073842
§ 371 (c)(1),
(2) Date: Feb. 25, 2022

(87) PCT Pub. No.: WO2021/037905
PCT Pub. Date: Mar. 4, 2021

(65) Prior Publication Data
US 2022/0312219 A1 Sep. 29, 2022

(30) Foreign Application Priority Data
Aug. 27, 2019 (FR) ..................................... 19 09420

(51) Int. Cl.
*H04L 29/08* (2006.01)
*B64D 11/00* (2006.01)
(Continued)

(52) U.S. Cl.
CPC ......... *H04W 12/63* (2021.01); *B64D 11/0015* (2013.01); *H04L 41/12* (2013.01);
(Continued)

(58) Field of Classification Search
None
See application file for complete search history.

(56) References Cited

U.S. PATENT DOCUMENTS

| 2007/0043608 A1* | 2/2007 | May | G06Q 10/10 |
| | | | 705/7.29 |
| 2010/0060050 A1 | 3/2010 | Muirhead | |

(Continued)

FOREIGN PATENT DOCUMENTS

WO WO 2017/116303 A1 7/2017
WO WO 2018/163087 A1 9/2018

OTHER PUBLICATIONS

French Search Report, from the French Patent Office in counterpart French Application No. 1909420, dated Apr. 28, 2020.
(Continued)

*Primary Examiner* — Christopher B Robinson
(74) *Attorney, Agent, or Firm* — ArentFox Schiff LLP

(57) ABSTRACT

The invention relates to a system for identifying a user terminal forming part of an entertainment system for a mobile passenger transport apparatus comprising a plurality of user terminals and a communication network connecting said user terminals, each user terminal comprising a screen, and being designed to be attached to a docking station positioned at a predetermined location. The docking station comprises an identification component encoding an identifier comprising spatial location information for the docking station, and the user terminal comprises an identifier reading device, adapted to obtain, upon command, said identifier from the identification component of the docking station to which said user terminal is attached, the user terminal comprising a memory and being adapted to store said identifier in said memory. The identifier is used during network communications in said communication network.

10 Claims, 4 Drawing Sheets

(51) Int. Cl.
*H04L 41/12* (2022.01)
*H04W 4/42* (2018.01)
*H04W 4/48* (2018.01)
*H04W 4/80* (2018.01)
*H04W 12/069* (2021.01)
*H04W 12/63* (2021.01)

(52) U.S. Cl.
CPC ............... *H04W 4/42* (2018.02); *H04W 4/48* (2018.02); *H04W 4/80* (2018.02); *H04W 12/069* (2021.01)

(56) References Cited

U.S. PATENT DOCUMENTS

| | | | | |
|---|---|---|---|---|
| 2012/0280784 | A1* | 11/2012 | Gaviria Velez ... | H04M 1/72403 340/5.7 |
| 2014/0071818 | A1* | 3/2014 | Wang .................... | H04W 4/029 370/230 |
| 2015/0009608 | A1* | 1/2015 | Nielsen .................. | B60L 1/006 361/679.01 |
| 2015/0185778 | A1* | 7/2015 | Nielsen ................ | G06F 1/1632 361/679.41 |
| 2017/0163788 | A1* | 6/2017 | Andersen .............. | H04N 7/142 |

OTHER PUBLICATIONS

International Search Report issued by the International Search Authority in corresponding International Application No. PCT/EP2020/073842, dated Sep. 14, 2020.

Malykhina, E., "New Jets Will Come Equipped with RFID, " Informationweek, Manhasset, NY, Nov. 29, 2004, http://www.informationweek.com/story/showArticle.jhtml?articleID=54200591 (2004).

* cited by examiner

SYSTEM AND METHOD FOR IDENTIFYING A USER TERMINAL FORMING PART OF AN ENTERTAINMENT SYSTEM FOR A MOBILE PASSENGER TRANSPORT APPARATUS

CROSS-REFERENCE TO RELATED APPLICATIONS

The present application for patent is a National Stage Entry of International Application PCT/EP2020/073842, filed Aug. 26, 2020 which claims priority to French Patent Application No. 19 09420, filed Aug. 27, 2019. The disclosure of the priority applications are incorporated in their entirety by reference herein.

FIELD OF INVENTION

The present invention relates to a user terminal identification system forming part of an entertainment system for a mobile passenger transport apparatus, as well as a method for identifying a user terminal forming part of an associated entertainment system for a mobile passenger transport apparatus.

BACKGROUND

The invention is in the field of in-vehicle entertainment systems, in particular inflight (IFE) systems that are found mainly on board long-haul commercial aircraft. It also applies to other inflight entertainment systems on board a mobile vehicle, such as on board a passenger bus.

Such in-vehicle entertainment systems comprise user terminals, with each user terminal having a screen that allows a passenger to visualize entertainment programs as well as other associated man/machine interfaces such as audio interfaces. In a known embodiment, each user terminal is attached via a docking station to a predetermined location, such as on the seat back in front of the passenger seat for which the user terminal is intended, with the screen positioned to face that passenger. The predetermined location is chosen so as to allow for comfortable visualization of the screen.

The user terminals are generally connected to each other by a wired or wireless communication network, and can be connected via this network to a content server. For example, multimedia content is distributed from this content server to the user terminals, based on an on-demand multimedia content delivery scheme.

In addition to accessing entertainment content (movies, interactive games, etc.), these entertainment systems make it possible for passengers to be notified of certain flight parameters. They can also be used by the operator of the mobile transport vehicle to broadcast safety messages and crew announcements.

One of the problems encountered in such onboard entertainment systems is the need to identify and locate each terminal, for the purpose of retrieving maintenance data or managing the topology of the communication network.

To perform such identification and localization, a known system implements a topological discovery of the communication network and a mapping of this topology to a table, previously stored, describing the spatial configuration of the compartment of the vehicle such as the aircraft in which the entertainment system is installed. The topological discovery of the network implements a neighbor detection software, and therefore implies a relatively sophisticated programming at the level of each user terminal. Moreover, such a system is dependent on the type of communication network implemented.

SUMMARY

There is a need to simplify the identification and location of user terminals in such a system.

To this end, the invention proposes a user terminal identification system forming part of an entertainment system for a mobile passenger transport apparatus comprising a plurality of user terminals and a communication network connecting said user terminals, each user terminal comprising a screen, and being adapted to be attached to a docking station positioned at a predetermined location.

This system comprises at least one docking station and an associated user terminal such that:
- the docking station comprises an identification component, encoding an identifier comprising information on the spatial location of the docking station, and
- the user terminal comprises an identifier reading device, adapted to obtain said identifier, upon command, from the identification component of the docking station to which said user terminal is attached, the user terminal comprising a memory and being adapted to store said identifier in said memory, the user terminal being further adapted to use said identifier during network communications in said communication network.

Advantageously, each user terminal is adapted to obtain an identifier from the docking station itself, and the identifier includes spatial location information of the docking station. Thus, there is no need to map between a network topology and a previously stored spatial configuration.

The user terminal identification system according to the invention may have one or more of the following features, taken independently or in any technically acceptable combinations thereof.

The identification component is configured to communicate data using short-range radio communication technology.

The identification component is a label, having a code printed thereon, said identification reading device comprising a digital image acquisition device adapted to capture said printed code.

The identification component is removable and/or reconfigurable.

The identification component further stores security data, and the user terminal comprises a module adapted to validate said identifier in relation to said security data, and, in the absence of validation, implements a limit in operation of the user terminal.

According to another aspect, the invention proposes a method for identifying a user terminal forming part of an entertainment system for a mobile passenger transport apparatus, the entertainment system comprising a plurality of user terminals and a communication network connecting said user terminals, each user terminal being adapted to be attached to a docking station positioned at a predetermined location, each user terminal comprising a processor adapted to implement the steps of:
- obtaining an identifier from an identification component carried by the docking station to which said user terminal is attached, said identifier comprising information on the spatial location of the docking station;

storing said identifier in a memory of the user terminal, and using said identifier to identify said user terminal during network communications in said communication network.

The method for identifying a user terminal according to the invention may have one or more of the features below, taken independently or in any technically acceptable combinations thereof.

The method further comprises acquisition of security data and validation of the obtained identifier in relation to said security data, and, in the absence of validation, a limit in operation of the user terminal.

Obtaining the identifier comprises:
verification of the presence of an identifier and associated storage date in the terminal's memory,
comparison of a time difference between a current date and said storage date with a predetermined duration, and
if the time difference is less than said predetermined duration, reading said identifier from the memory.

If the time difference is greater than said predetermined duration, an identifier reading from the identification component is implemented.

According to another aspect, the invention relates to an entertainment system for a mobile passenger transport apparatus comprising a plurality of user terminals and a communication network connecting said user terminals, each user terminal comprising a screen, and being adapted to be attached to a docking station positioned at a predetermined location, wherein:
each docking station comprises an identification component encoding an identifier comprising spatial location information of the docking station, and
each user terminal comprises an identifier reading device, adapted to obtain said identifier, upon command, from the identification component of the docking station to which said user terminal is attached, the user terminal comprising a memory and being adapted to store said identifier in said memory, the user terminal being further adapted to use said identifier during network communications in said communication network.

BRIEF DESCRIPTION OF THE DRAWINGS

Further features and advantages of the invention will be apparent from the description given below by way of indication and not in any way limiting, with reference to the appended figures, of which.

DETAILED DESCRIPTION

The invention will be described hereinafter more particularly in its application in an entertainment system on board an aircraft, also referred to as an IFE system.

Figure 1:
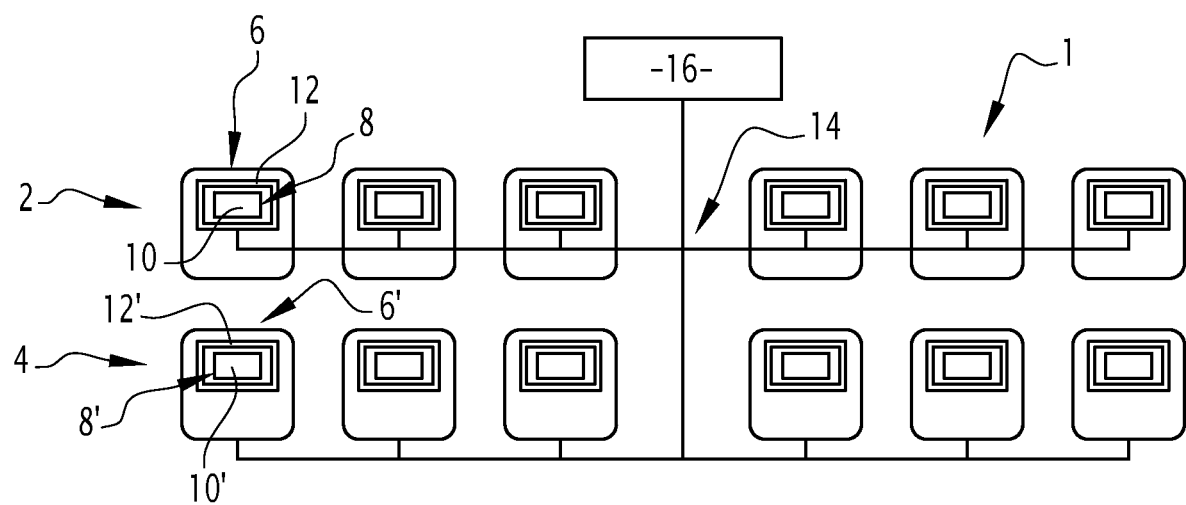
FIG. 1 is a schematic view of an entertainment system for an aircraft in one embodiment of the invention.

FIG. 1 is a schematic view of an IFE system 1, carried in an aircraft cabin (not shown).

In FIG. 1, two seat rows 2, 4, each comprising six seats 6, 6', grouped in threes, are illustrated schematically and in a non-limiting manner. Of course, this illustration is schematic, as any number of rows and seats per row can be envisaged depending on the configuration of the aircraft, and, more generally, of the vehicle carrying the entertainment system.

In the illustrated example, on the back of each seat 6, 6', a user terminal 8, 8' is installed, comprising a screen 10, 10', installed in a docking station 12, 12'.

The docking station is adapted to receive and set the terminal in a selected position, and comprises adapted mechanical and electrical connecting elements.

Preferably, the user terminal 8, 8' is removable, so that it can be easily replaced in case of malfunction, and thus can be easily manipulated to be inserted and removed from the corresponding docking station.

Each docking station 12, 12' is placed at a predetermined spatial location.

Preferably, the docking station 12 of a user terminal 8 is attached to or recessed into the backrest of a seat 6, so that the screen 10 of the user terminal 8 is comfortably visible to the passenger seated in the seat 6', located behind the seat 6.

In addition, in a passenger aircraft cabin, certain docking stations 12, 12' are placed in other predetermined locations, such as on an aircraft cabin bulkhead.

The user terminals 8, 8' are connected in order to communicate in a communication network 14, and are adapted to communicate with a server 16 via this communication network 14.

The server 16 is an onboard server, for example, containing multimedia content, which is transmitted to the user terminals upon request.

In one embodiment, the communication network 14 is a wired network.

In another embodiment, the communication network 14 is a wireless communication network, such as a Wi-Fi network.

The IFE system 1 according to the invention implements a user terminal identification system 18, the operation of which is described in detail in the following description.

Figure 2:
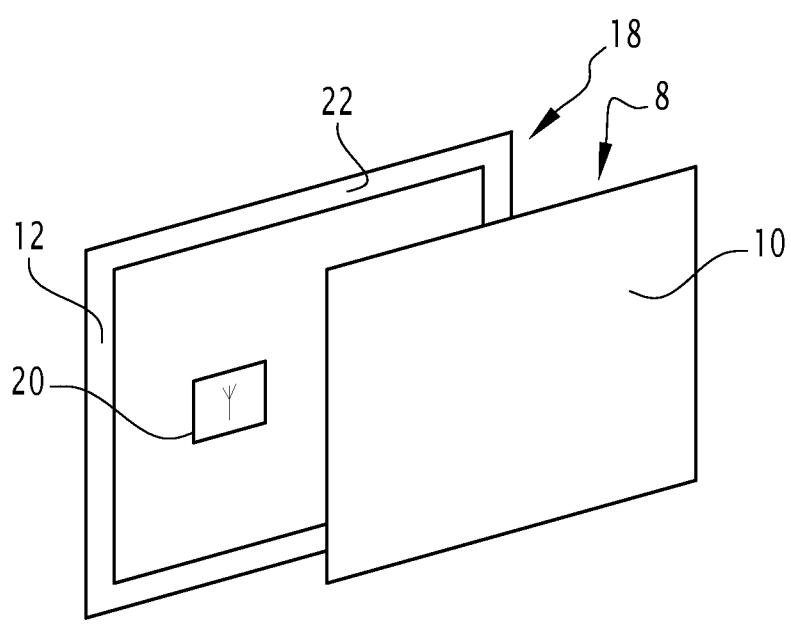
FIG. 2 is a schematic view of a user terminal identification system in one embodiment of the invention.

According to one embodiment of the invention illustrated in FIG. 2, the user terminal identification system 18 comprises at least one docking station 12 and a user terminal 8. The docking station 12 is equipped with an identification component 20, which is readable by the user terminal 8 when the user terminal 8 is installed in the docking station.

Preferably, each docking station 12, 12' of the IFE system 1 includes an identification component 20, and each user terminal 8, 8' is configured to read an identifier carried by the identification component 20 when the user terminal is installed in the docking station.

In the embodiment shown in FIG. 2, the identification component 20 is placed in the perimeter located within the frame 22 of the docking station 12, the frame being mechanically adapted to keep the terminal 8 stationary, for example.

Advantageously, the identification component 20 stores an identifier containing spatial location information of the docking station 12.

In one embodiment, the spatial location information is information specific to the passenger seat for which the user terminal 8 installed in the docking station 12 is intended. For example, the spatial location information includes a seat identification number (such as 5C), similar to the number printed on boarding passes.

Figure 3:
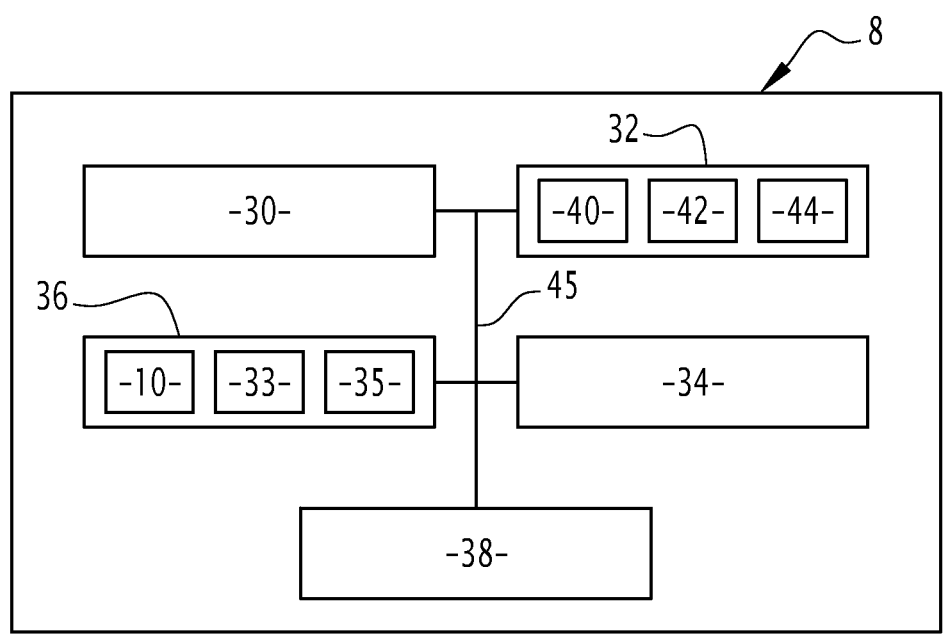
FIG. 3 is a block diagram of a user terminal in one embodiment.

In one embodiment, the identification component 20 is a card adapted to communicate data stored on this card by short-range radio link, according to near field control (NFC)

technology. The user terminal 8 then includes a device for reading data transmitted using NFC technology, as illustrated in FIG. 3.

In a variant, the identification component 20 is an RFID radio tag or an iBeacon® type component.

Preferably, the identification component 20 is in the form of a smart card or SIM card, with dimensions ranging from 12.30 mm×8.80 mm to 85.60 mm×53.98 mm.

According to another embodiment, the identification component 20 is a label on which a barcode or QR-code is printed, i.e. a code readable by a suitable device and adapted to encode data that is decodable by the suitable reader 30.

Preferably, the identification component 20 is removable and/or reconfigurable.

As illustrated in FIG. 3, a user terminal 8 according to the invention includes a device 30 for reading data from the identification component 20 carried by the docking station 12.

In the case where the identification component 20 is a tag carrying a code readable by a suitable device as explained above, the reading device 30 comprises a digital image acquisition device (such as a camera) positioned to capture the docking station area in which the tag 20 is located. The device 30 also includes a processing module for analyzing the acquired image and decoding the encoded data. This module takes the form of executable software, for example.

The user terminal 8 also comprises a data processing unit 32, e.g. a computational processor, an electronic memory 34 adapted to store data, a man/machine interface 36 in particular comprising a screen 10, an audio interface unit 33, a command input interface 35, and a communication module 38, adapted to communicate via a communication bus 45.

In one embodiment, the screen 10 is a touch screen and also forms the command input interface.

The processing unit 32 implements a module 40 for reading the identifier from the identification component carried by the docking station to which said user terminal is attached, a module 42 for validating the identifier and a module 44 for storing and using the identifier.

In one embodiment, these modules take the form of executable software code.

In a variant, not shown, the modules 40, 42, 44 each take the form of a programmable logic component such as a field programmable gate array (FPGA), a graphics processor (GPU) or a general-purpose computing on graphics processing units (GPGPU), or as a dedicated integrated circuit such as an Application Specific Integrated Circuit (ASIC).

Figure 4:
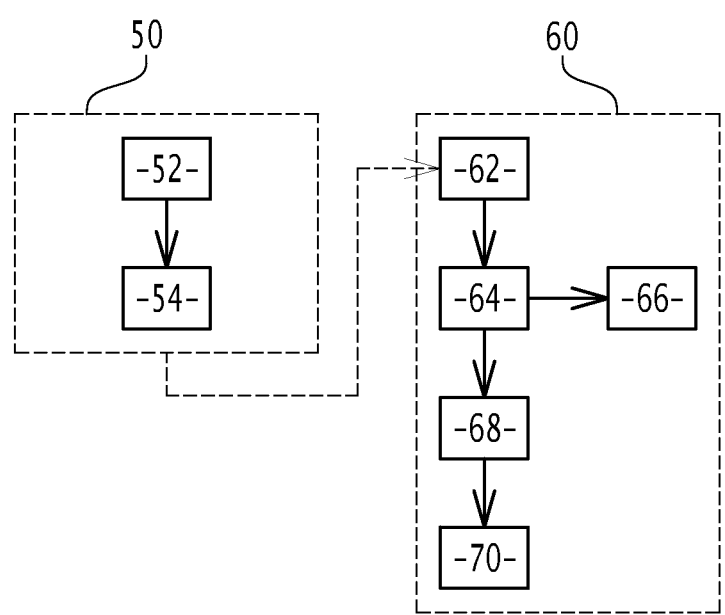
FIG. 4 is a synopsis of the main steps of a method for identifying a user terminal in one embodiment.

FIG. 4 is a synoptic of the main steps of a method for identifying a user terminal according to one embodiment of the invention.

The method for identifying a user terminal comprises two phases: an initialization phase 50, in which the identification component is installed, and an operation phase 60, in which the user terminal communicates in the communication network 14, in particular to provide the various entertainment services offered to the user.

In the embodiment illustrated in FIG. 4, the initialization phase 50 includes a first step 52, of inserting the selected identifier into the identification component 20, and a second step 54, of installing the identification component in the appropriate location.

In a variant, the steps of inserting the identifier and of installing the identification component are performed in reverse order, first installing a blank identification component and then inserting an identifier to be stored by that identification component, as explained in more detail below.

As explained above, the identification component comprises at least one identifier containing spatial location information of the docking station comprising the identification component.

In addition to this identifier containing spatial location information, further security data is inserted into the identification component 20. For example, for a secure connection between a user terminal and the server 16, a security certificate is used to establish the connection. In this case, the additional security data comprises such a security certification. Advantageously, this ensures that a connection is established between the server and the user terminal located at the declared location, thereby increasing security. In addition, the user terminal setup is alleviated because it is not necessary to pre-install a security certificate on a user terminal prior to installation.

Inserting an identifier that includes spatial location information of the docking station, such as a seat number in an airplane, requires knowledge of this spatial location information.

Several embodiments of the step 52 of inserting the identifier into the identification component are envisaged.

According to a first embodiment, the identification component is programmed with a reference indicating the associated seat, such as a seat number. The identification component is installed during the manufacture of an aircraft at the spatial location corresponding to its programming.

According to a second embodiment, the seats are each provided with a docking station equipped with a blank identification component, and the identifier insertion is done by a specialized operator, during a installation phase of the IFE entertainment system, via a device for programming the identification components.

According to a third embodiment, the identifier insertion is done by control of the user terminal 8 in a installation mode, such as via a numerical keypad displayed on the screen of the user terminal on which the installation operator enters the identifier. The identifier, as well as any additional security data, is stored in the identification component.

According to one embodiment, if the identifier is made by a code (barcode, QR-code or number and letter inscription) readable by a suitable device, the step 52 is performed by generating the code in the suitable format, followed by printing the code on a medium. The installation step 54 is performed by attaching the medium to the docking station of the associated seat, at a predetermined spatial location.

Following the initialization phase 50, at a later time, the operation phase 60 is implemented.

The user terminal is installed on the docking station and is ready to be put into operation to deliver multimedia content to the passenger and/or to deliver other information, at the request of the passenger, or of the aircraft crew in the case of safety messages, for example.

The operating phase 60 comprises a step 62 of obtaining the identifier from the identification component carried by the docking station. This step is performed upon command from the user terminal, for example, following the powering up of the user terminal.

In a variant, the step 62 is performed, upon command of the user terminal, with a predetermined time frequency.

According to another variant, step 62 comprises a sub-step of checking for the presence of an identifier already stored in a memory 34 of the user terminal, as well as an associated storage date.

If an identifier is present in the memory, it is checked whether the time difference between the current date and the storage date is less than a predetermined duration, such as 24 hours, 7 days, 1 month, etc. In other words, it is checked whether the storage date is not older than the predetermined time set. If the time difference is less than this predetermined time, the identifier is read from the memory, and the step 62 ends.

If the time difference is greater than this predetermined time, reading the identifier from the identification component is required. The step 62 then includes operating the identifier reading device.

The step 62 is followed by a step 64, in the embodiment shown in FIG. 4, of validating the identifier obtained, in connection with additional security data obtained from the identification component.

For example, the user terminal attempts to establish a secure connection with the server, by implementing a secure sockets layer (SSL) protocol with mutual authentication, for example. The secure connection is based on a certificate contained in the additional security data, and the user ID is also transmitted to the server. The server validates the user terminal's identifier. Functionalities associated to the spatial location of the user terminal are automatically implemented, such as the provision of a catalog of downloadable multimedia content.

In case of a negative validation, there is a risk of a security breach. In this case, the user terminal goes into a so-called "degraded" operating mode (step 66), in which the user terminal only offers functionalities for viewing pre-recorded multimedia content.

According to one variant, where unauthorized intrusion is detected, the user terminal concerned becomes inoperative; in other words, no functionality is executed. The step 66 then corresponds to disabling the user terminal.

In the case of a positive validation, the step 64 of validating the identifier is followed by a step 68 of memorizing the identifier obtained, and of authorizing operation in nominal mode. In this operating mode, the user terminal has access to all the functionalities offered by the entertainment system 1.

The obtained identifier is used (step 70) to identify said user terminal during network communications in said communication network.

For example, in one embodiment, the identifier is used when a passenger calls for assistance from a crew member. For example, the user terminal includes an interface, such as a touch-sensitive button, allowing the passenger to make a call. Upon action by the passenger, the identifier is transmitted to the server 16, and then the server 16 transmits the identifier to at least one crew member terminal, which receives a call indication and the identifier carrying the spatial location information (e.g., seat number) of the passenger who initiated the call. Thus, the crew member immediately knows where the passenger call is coming from.

In one embodiment, in addition, the usage comprises storing the maintenance data of the user terminal, identified by the obtained identifier, and transmitting this, in association with the identifier, to the server 16 or other equipment connected to the communication network 14 adapted to collect maintenance information in view of a subsequent intervention. Advantageously, taken from the identifier, the spatial location of the terminal requiring maintenance is immediate.

In a simplified embodiment, the method for identifying a user terminal does not implement the identifier validation step 64, and only nominal mode operation is contemplated.

The invention claimed is:

1. A system for identifying a user terminal forming part of an entertainment system for a mobile passenger transport apparatus comprising a plurality of user terminals and a communication network connecting said user terminals, each user terminal comprising a screen, and being adapted to be set on a docking station positioned at a predetermined location, characterized in that it comprises at least one docking station and an associated user terminal and wherein:
   the docking station comprises an identification component encoding an identifier comprising information on the spatial location of the docking station, and
   the user terminal comprises an identifier reading device, adapted to obtain said identifier, upon command, from the identification component of the docking station to which said user terminal is attached, the user terminal comprising a memory and being adapted to store said identifier in said memory, the user terminal being further adapted to use said identifier when communicating over the network in said communication network.

2. The system according to claim 1, wherein said identification component is configured to communicate data according to a short-range radio communication technology.

3. The system according to claim 1, wherein said identification component is a label having a code printed thereon, said identifier reading device comprising a digital image acquisition device adapted to capture said printed code.

4. The system according to claim 1, wherein said identification component is removable or reconfigurable.

5. The system according to claim 1, wherein said identification component further stores security data, and the user terminal comprises a module adapted to validate said identifier relating to said security data, and, in the absence of validation, to limit of operation of the user terminal.

6. A method for identifying a user terminal forming part of an entertainment system for a mobile passenger transport apparatus, the entertainment system comprising a plurality of user terminals and a communication network connecting said user terminals, each user terminal being adapted to be attached to a docking station positioned at a predetermined location, each user terminal comprising a processor adapted to implement steps of:
   a. —obtaining an identifier from an identification component carried by the docking station to which said user terminal is attached, said identifier containing spatial location information of the docking station, and
   b. —storing said identifier in the user terminal memory and using said identifier to identify said user terminal during network communications in said communication network.

7. The method according to claim 6, further comprising acquiring security data and validating the obtained identifier in relation to said security data, and, in the absence of validation, limiting operation of the user terminal.

8. The method according to claim 6, wherein obtaining an identifier comprises:
   verification of the presence of an identifier and associated date of storage in the terminal's memory,
   comparison of a time difference between a current date and said storage date with a predetermined duration, and
   if the time difference is less than said predetermined duration, reading said identifier from the memory.

9. The method according to claim 8, wherein if the time difference is greater than said predetermined duration, a reading identifier from the identification component is implemented.

10. An entertainment system for a mobile passenger-transport apparatus comprising a plurality of user terminals and a communication network connecting said user terminals, each user terminal comprising a screen, and being adapted to be attached to a docking station positioned at a predetermined location, wherein:

each docking station comprises an identification component encoding an identifier, comprising spatial location information of the docking station, and each user terminal comprises an identifier reading device, adapted to obtain, upon command, said identifier from the identification component of the docking station to which said user terminal is attached, the user terminal comprising a memory and being adapted to store said identifier in said memory, the user terminal being further adapted to use said identifier during network communications in said communication network.

\* \* \* \* \*